US011753121B1

(12) United States Patent
Signorelli (10) Patent No.: US 11,753,121 B1
(45) Date of Patent: Sep. 12, 2023

(54) MULTI-PURPOSE LIGHT SYSTEM FOR WATERCRAFTS

(71) Applicant: Brian Signorelli, Lafayette, LA (US)

(72) Inventor: Brian Signorelli, Lafayette, LA (US)

( * ) Notice: Subject to any disclaimer, the term of this patent is extended or adjusted under 35 U.S.C. 154(b) by 0 days.

(21) Appl. No.: 17/883,733

(22) Filed: Aug. 9, 2022

Related U.S. Application Data (60) Provisional application No. 63/230,930, filed on Aug. 9, 2021.

(51) Int. Cl.
| | |
|---|---|
| *B63B 45/04* | (2006.01) |
| *B63B 45/02* | (2006.01) |
| *B63B 45/06* | (2006.01) |
| *B63B 45/08* | (2006.01) |
| *B60Q 1/00* | (2006.01) |

(52) U.S. Cl.
CPC .............. *B63B 45/04* (2013.01); *B63B 45/02* (2013.01); *B63B 45/06* (2013.01); *B63B 45/08* (2013.01); *B60Q 1/0041* (2013.01)

(58) Field of Classification Search
CPC ......... B63B 45/00; B63B 45/02; B63B 45/04; B63B 45/06
See application file for complete search history.

(56) References Cited

U.S. PATENT DOCUMENTS

| | | | | |
|---|---|---|---|---|
| 4,884,173 A | * | 11/1989 | Cassidy ................. | B60Q 1/245 362/543 |
| 5,142,457 A | | 8/1992 | Wehner | |
| 5,335,149 A | | 8/1994 | Evans | |
| 5,508,895 A | * | 4/1996 | Wagoner, Jr. ............ | B60Q 1/18 362/477 |
| 5,537,299 A | | 7/1996 | Perry | |
| 6,394,634 B2 | | 5/2002 | Kitchin et al. | |
| 6,499,867 B1 | * | 12/2002 | Neal ....................... | B63B 45/02 362/477 |
| 7,021,802 B1 | | 4/2006 | Wyatt | |
| D575,424 S | | 8/2008 | Gebhard et al. | |
| 7,946,741 B2 | * | 5/2011 | Nichols ................. | B60Q 1/2657 362/477 |
| 11,305,850 B1 | * | 4/2022 | Vydrzal ................... | B63B 45/02 |
| 2008/0247161 A1 | * | 10/2008 | Hulsey ................... | B63B 45/04 362/227 |

OTHER PUBLICATIONS

Navigation Bow Light sold on internet at https://fishingvault.com/collections/boat-lights/products/navigation-bow-light-with-built-in-headlight-and-wireless-remote-control.

* cited by examiner

*Primary Examiner* — Alexander K Garlen
(74) *Attorney, Agent, or Firm* — Greg Mier (57) ABSTRACT

A multi-purpose light system for watercrafts that can be used as a navigational light and a light to increase visibility, both inside and outside the watercraft, and to provide a signal for assistance if needed.

14 Claims, 8 Drawing Sheets

MULTI-PURPOSE LIGHT SYSTEM FOR WATERCRAFTS

CROSS REFERENCE TO RELATED APPLICATIONS

The present application claims priority from provisional patent application No. 63/230,930, filed on Aug. 9, 2021.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC

Not applicable.

FIELD OF THE INVENTION

The subject invention relates to lighting systems for watercrafts.

BACKGROUND AND SUMMARY OF THE INVENTION

Navigation light systems are an important safety feature on most types of watercrafts. When most watercrafts are being operated between sunset and sunrise, or in other times of restricted visibility, such as in fog or rain, appropriate navigation lights must be displayed to avoid collisions with other watercrafts.

In general, all navigation light systems include one or more white lights and a set of red and green sidelights, which indicate the port and starboard side of a watercraft. The specific type of navigation lights required on a watercraft depends on several factors including:

The length of the watercraft: e.g. under or over 12 meters;
Whether the watercraft is being powered by an engine;
Where the watercraft is being operated, e.g. inland or international waters; and
Whether the watercraft is at anchor.

The present invention is designed to provide a safer experience for watercraft users by providing a light system that not only can be used as a navigational light, but also can be used to increase visibility, both inside and outside the watercraft, and to provide a signal for assistance if needed.

BRIEF DESCRIPTION OF THE DRAWINGS

The accompanying drawings are provided for the purpose of illustration only and are not intended as a definition of the limits of the present invention. The drawings illustrate a preferred embodiment of the present invention, wherein.

DESCRIPTION OF THE INVENTION

While the present invention will be described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof).

As shown in FIGS. 1 through 8, the present invention is a multi-purpose light system 10 for watercrafts. The primary components of the light system 10 include a main light housing 11, a main light pole 12, a navigational light housing 13, a navigational light pole 14, and an electrical connection box 15.

Figure 8:
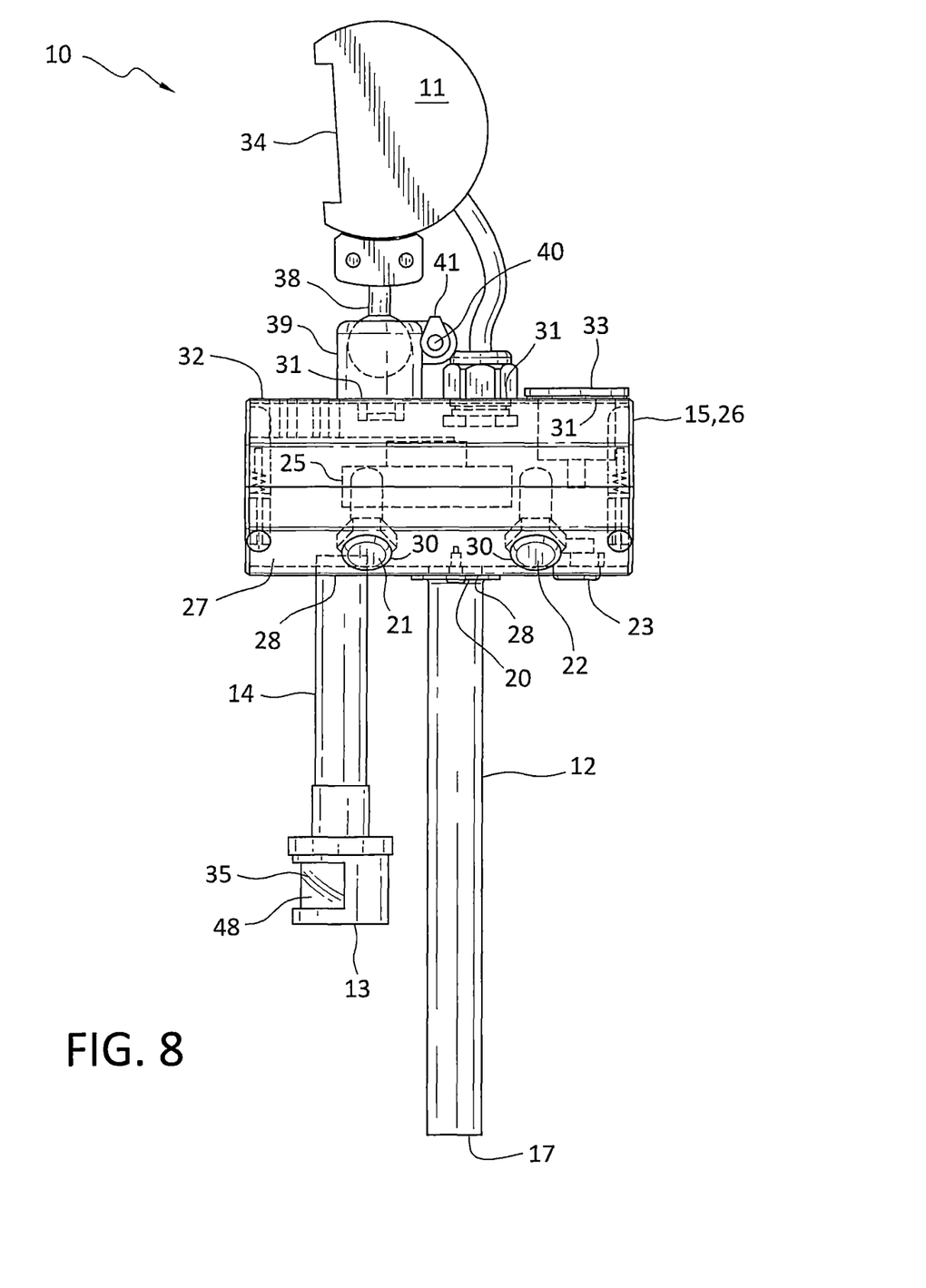
FIG. 8 is a side view of a preferred embodiment of the multi-purpose light system, showing the internal parts of the electrical connection box of the light system.
Figure 9:
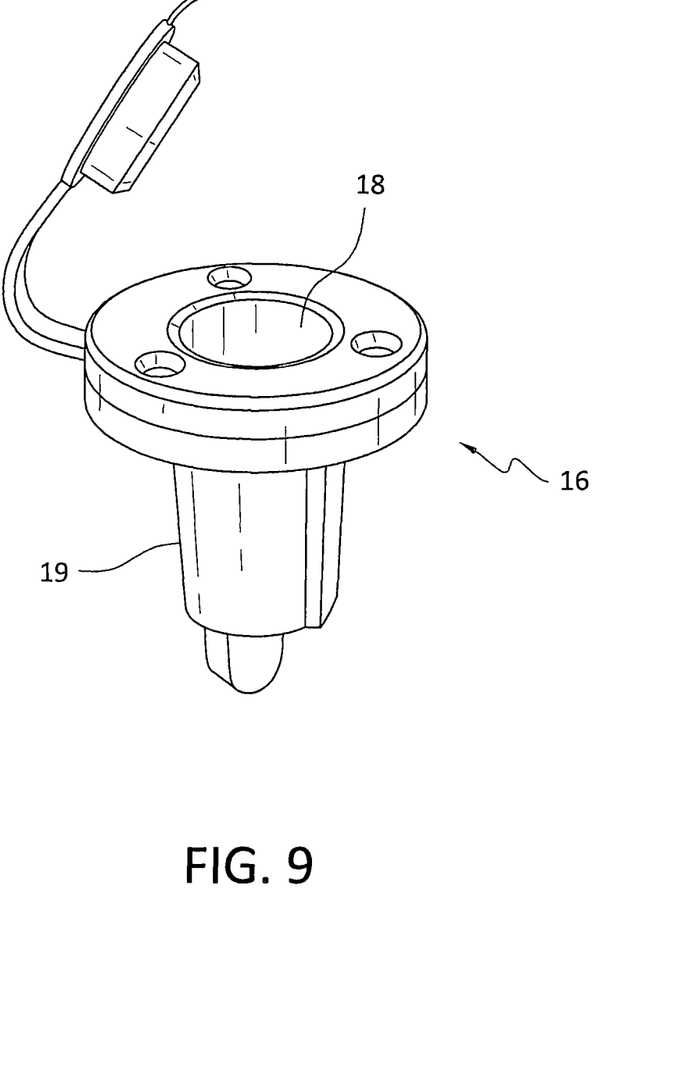
FIG. 9 is a perspective view of a plug-in base used on a watercraft.

In the preferred embodiment of the present invention, the main light pole 12 extends between the electrical connection box 15 and a plug-in base 16 on a watercraft, similar to the one shown in FIG. 8. The bottom 17 of the main light pole 12 can be removably inserted into the plug-in base 16 on the watercraft. The bottom 16 of the main light pole 12 preferably has a set of contacts (not shown) that insert into a socket 18 in the plug-in base 16 to provide electrical power through electrical wires and electrical connections (not shown) to the electrical connection box 15, the main light housing 11, and the navigational light housing 13. The set of contacts in the plug-in base 16 are preferably contained in a plastic assembly 19 for water resistance, corrosion protection, and damage prevention. The main light pole 12 is preferably made of stainless steel but can be made of any material that is sturdy and corrosion resistant, such as plastic.

The length of the main light pole 12 can vary, depending on where the main light pole 12 will be located on the watercraft. For placement on the bow of the watercraft, the main light pole 12 will be relatively short. In contrast, for placement on the stern of the watercraft, the main light pole 12 will be longer than a main light pole 12 that would be placed at the bow. The length of the main light pole 12 placed at the stern of a watercraft should be long enough to prevent light from being cast into the watercraft operator's field of view.

Figure 5:
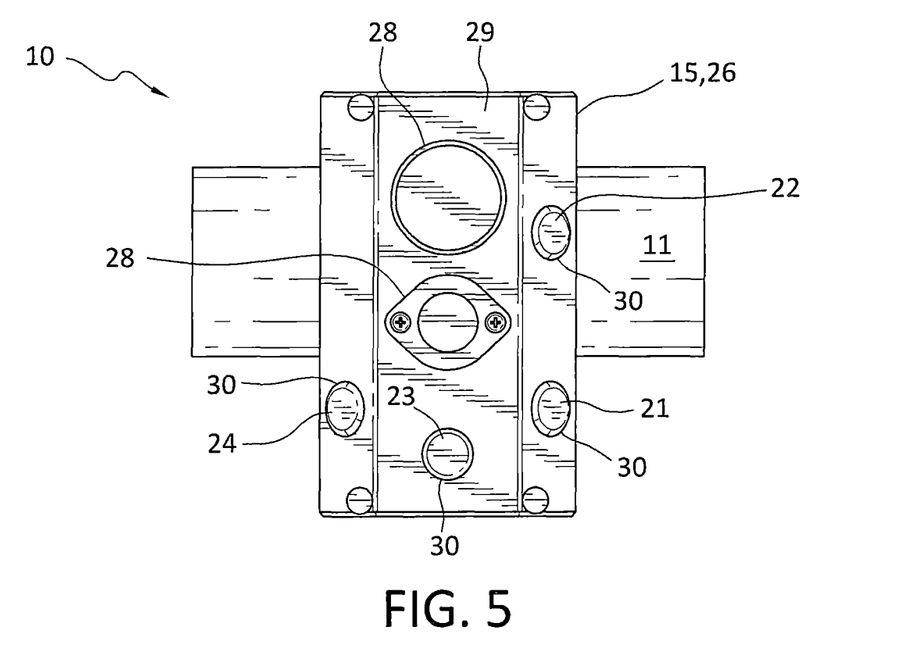
FIG. 5 is a bottom view of a preferred embodiment of the multi-purpose light system.

As mentioned above, the bottom 17 of the main light pole 12 is preferably connected to a plug-in base 16 on a watercraft. The top 20 of the main light pole 12 is preferably connected to the electrical connection box 15. The electrical connection box 15 serves as a junction box for electrical wires, electrical connections, and electrical switches for the main light housing 11, the navigational light housing 13, and other electrical components of the invention. Electrical wires that run through the main light pole 12 enter the electrical connection box 15 and then are configured in such a way to provide electrical power to the main light housing 11, the navigational light housing 13, and other electrical components in the electrical connection box 15. As shown in FIG. 5, included within the wiring circuitry are push buttons 21, 22, 23, and 24, which allow the user of the light system 10 to change the electrical output to the main light housing 11, the horn 25 located inside the electrical connection box 15 (shown in FIG. 8), and the navigational light housing 13, as discussed in more detail below. Also preferably included within the wiring circuitry are overcurrent protection devices (not shown) to protect against short-circuit current values, ground-fault current values, and overload current values.

Figure 1:
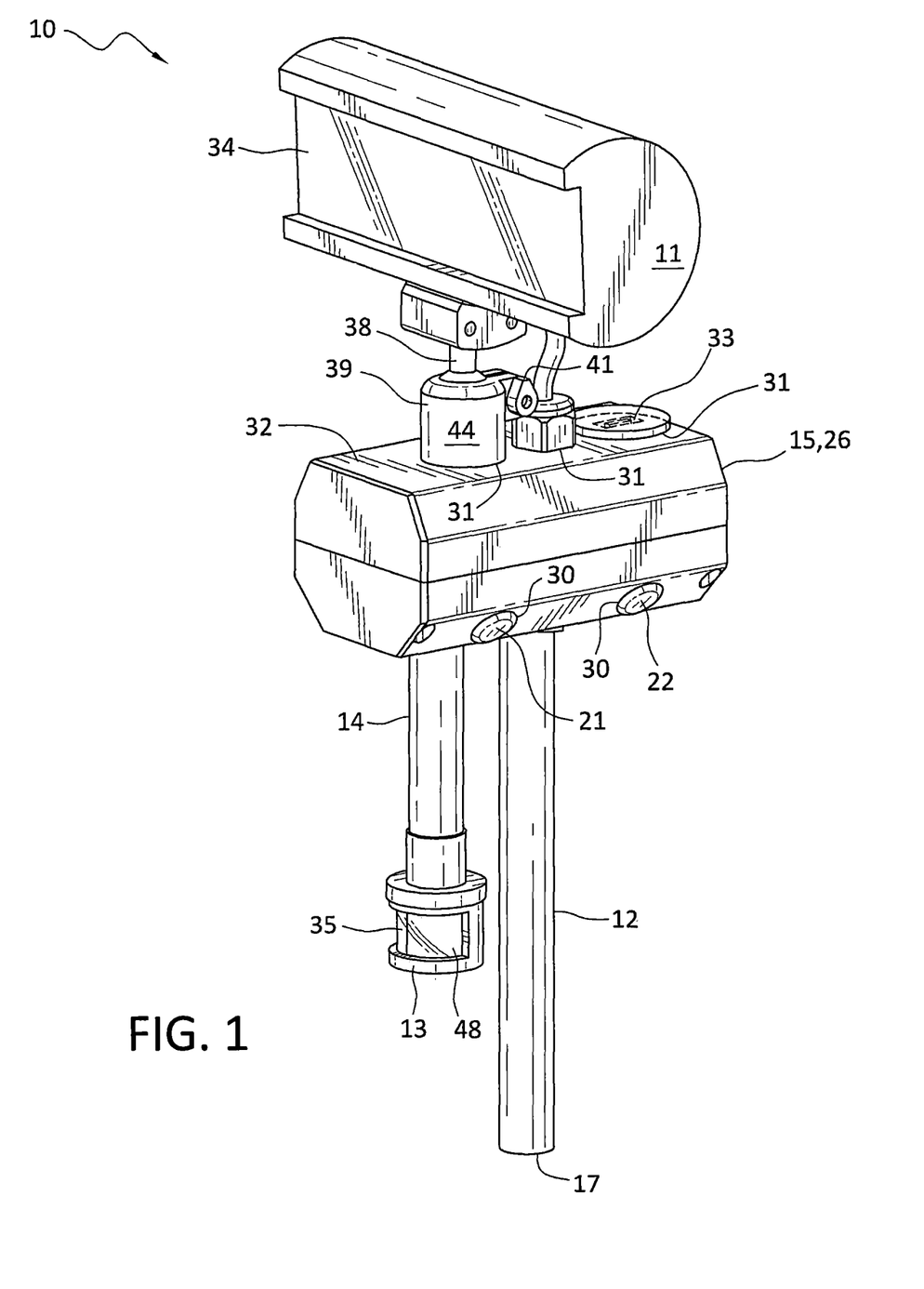
FIG. 1 is a perspective view of a preferred embodiment of the multi-purpose light system.
Figure 2:
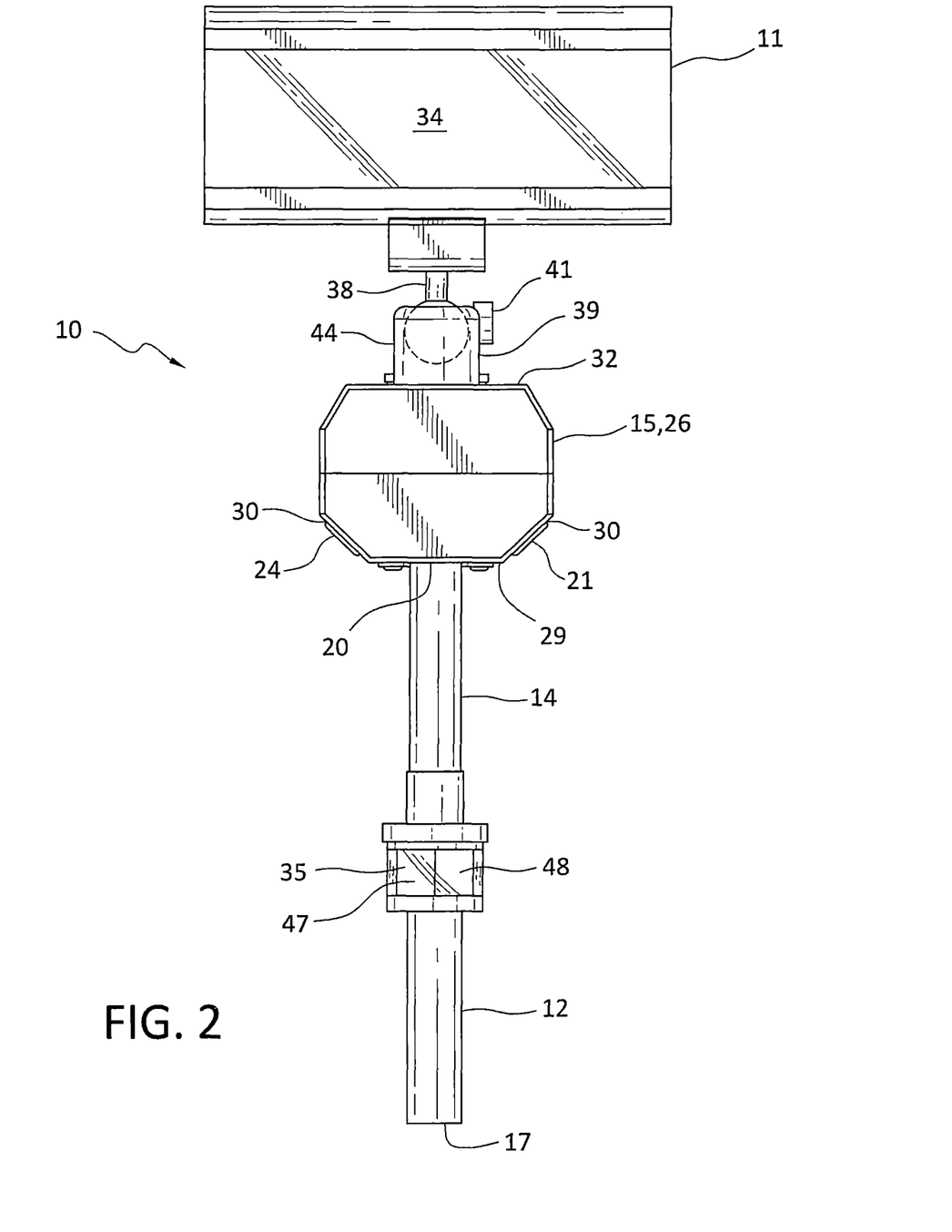
FIG. 2 is a front view of a preferred embodiment of the multi-purpose light system.
Figure 3:
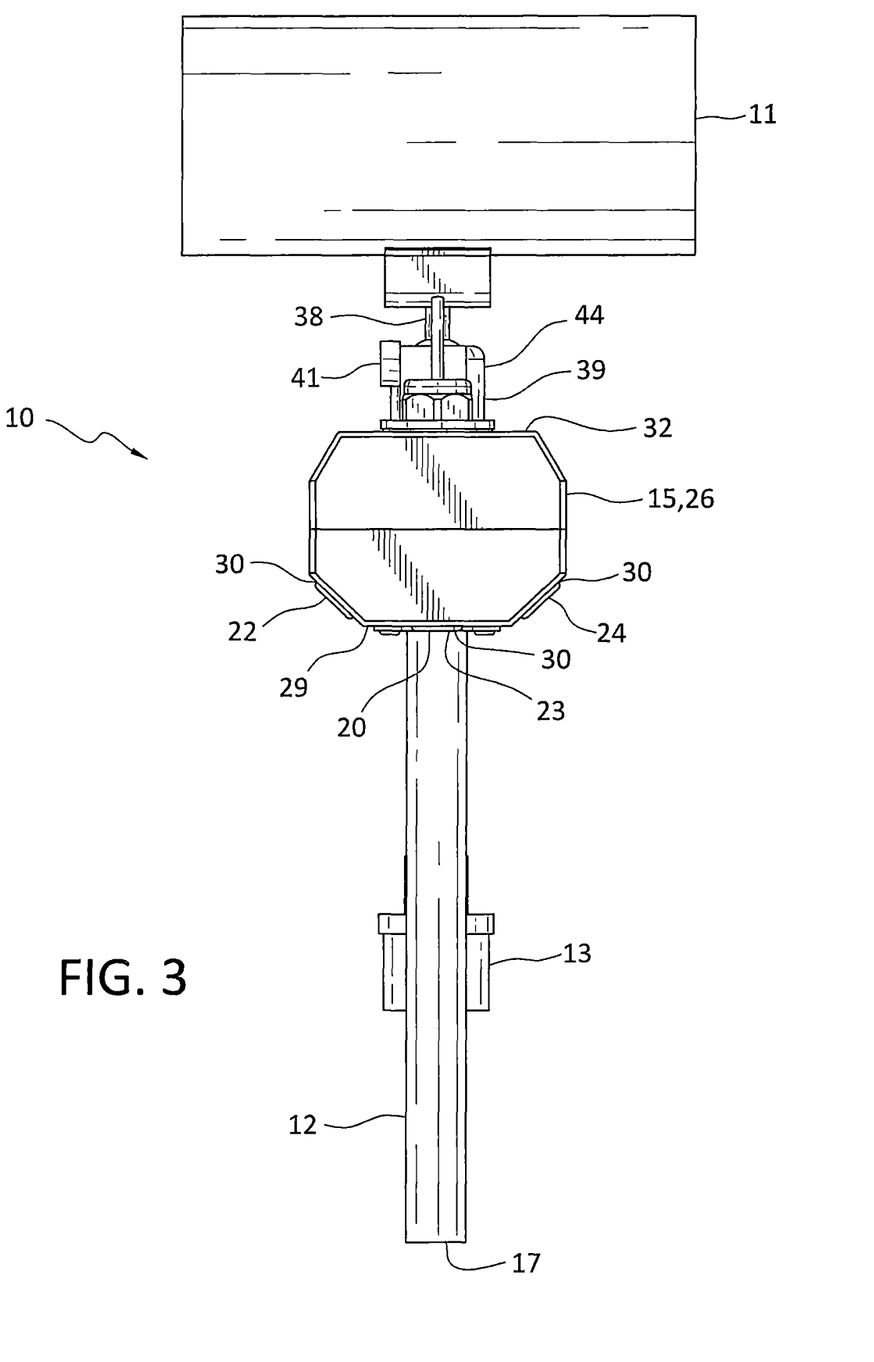
FIG. 3 is a back view of a preferred embodiment of the multi-purpose light system.
Figure 4:
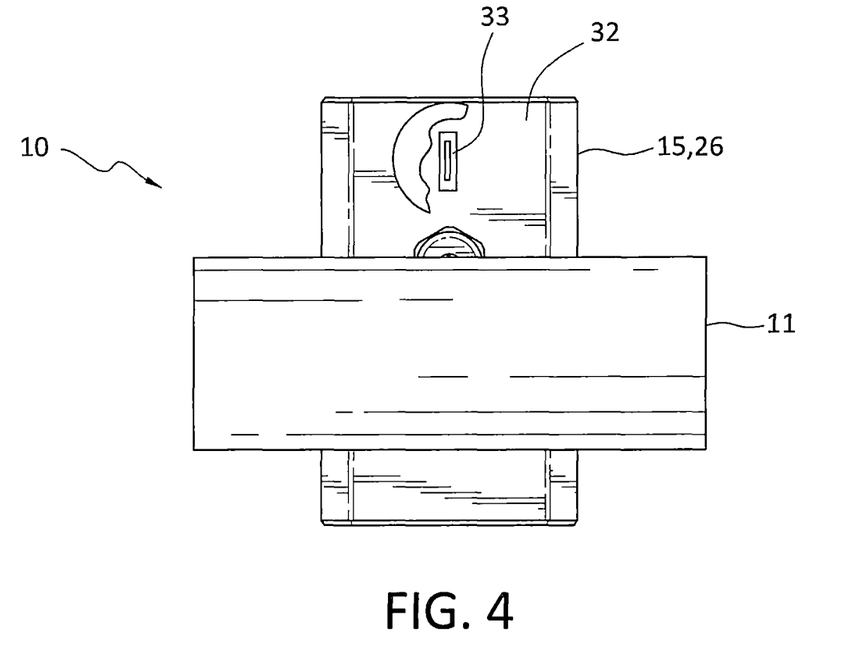
FIG. 4 is a top view of a preferred embodiment of the multi-purpose light system.

As shown in FIG. 8, the electrical connection box 15 has a structure 26 that forms a chamber 27 in which the aforementioned electrical wires are configured to provide electrical power to the main light housing 11, the navigational light housing 13, and other electrical components in the electrical connection box 15. The structure 26 also provides a location to mount the push buttons 21, 22, 23, and 24, as shown in FIG. 5. The structure 26 preferably has two holes 28 in its bottom 29 through which electrical wires can be run to and from the main light pole 12 and the navigational light pole 14. The structure 26 preferably has four additional holes 30 in its bottom 29 for mounting push buttons 21, 22, 23, and 24, as shown in FIG. 5. The structure 26 preferably has three holes 31 in its top 32 for mounting the main light housing 11, for running electrical wires from the structure 26 to the main light housing 11, and for mounting a USB port 33, as shown in FIGS. 1, 3, and 4.

As mentioned above, push button 21 controls the light 34 in the main light housing 11. One push of push button 21 changes the light 34 in the main light housing 11 from off to on. Another push of push button 21 changes the light 34 in the main light housing 11 from on to off.

As mentioned above, push button 22 causes the light 34 in the main light housing 11 to flash at a rate of 50 to 70 times a minute. To activate the flashing mode, the light 34 in the main light housing 11 must be turned off using push button 21. With the light 34 in the main light housing 11 off, one push of the push button 22 causes the light 34 to flash at a rate of 50 to 70 times a minute. Another push of the push button 22 turns the light 34 off.

As mentioned above, push button 23 controls the horn 25 (shown in FIG. 8). Holding in push button 23 activates the horn 25. Releasing push button 23 deactivates the horn 25.

As mentioned above, push button 24 controls the light 35 in the navigational light housing 13. One push of push button 24 changes the light 35 in the navigational light housing 13 from off to on. Another push of push button 24 changes the light 35 in navigational light housing 13 from on to off.

Figure 6:
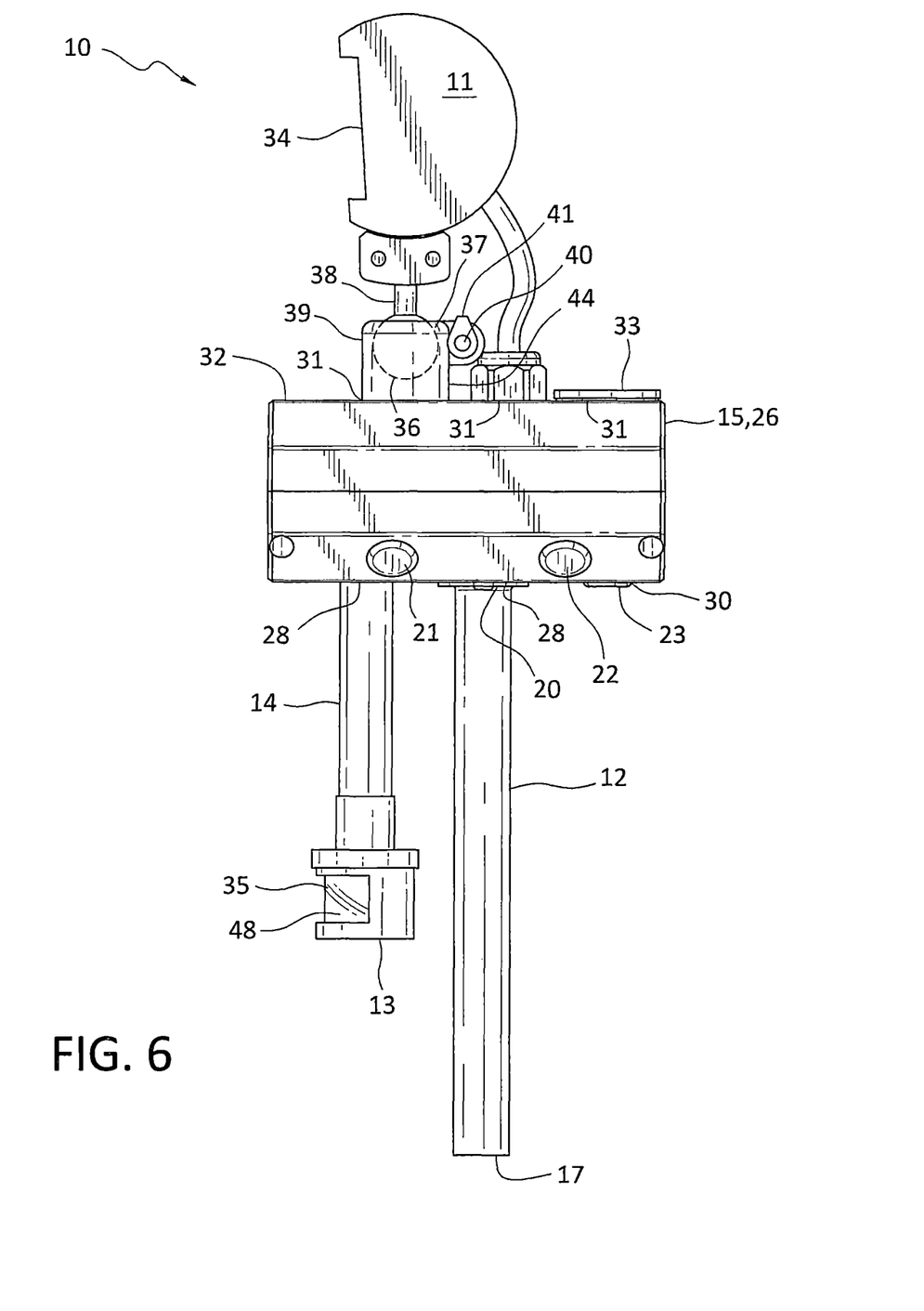
FIG. 6 is a side view of a preferred embodiment of the multi-purpose light system.
Figure 7:
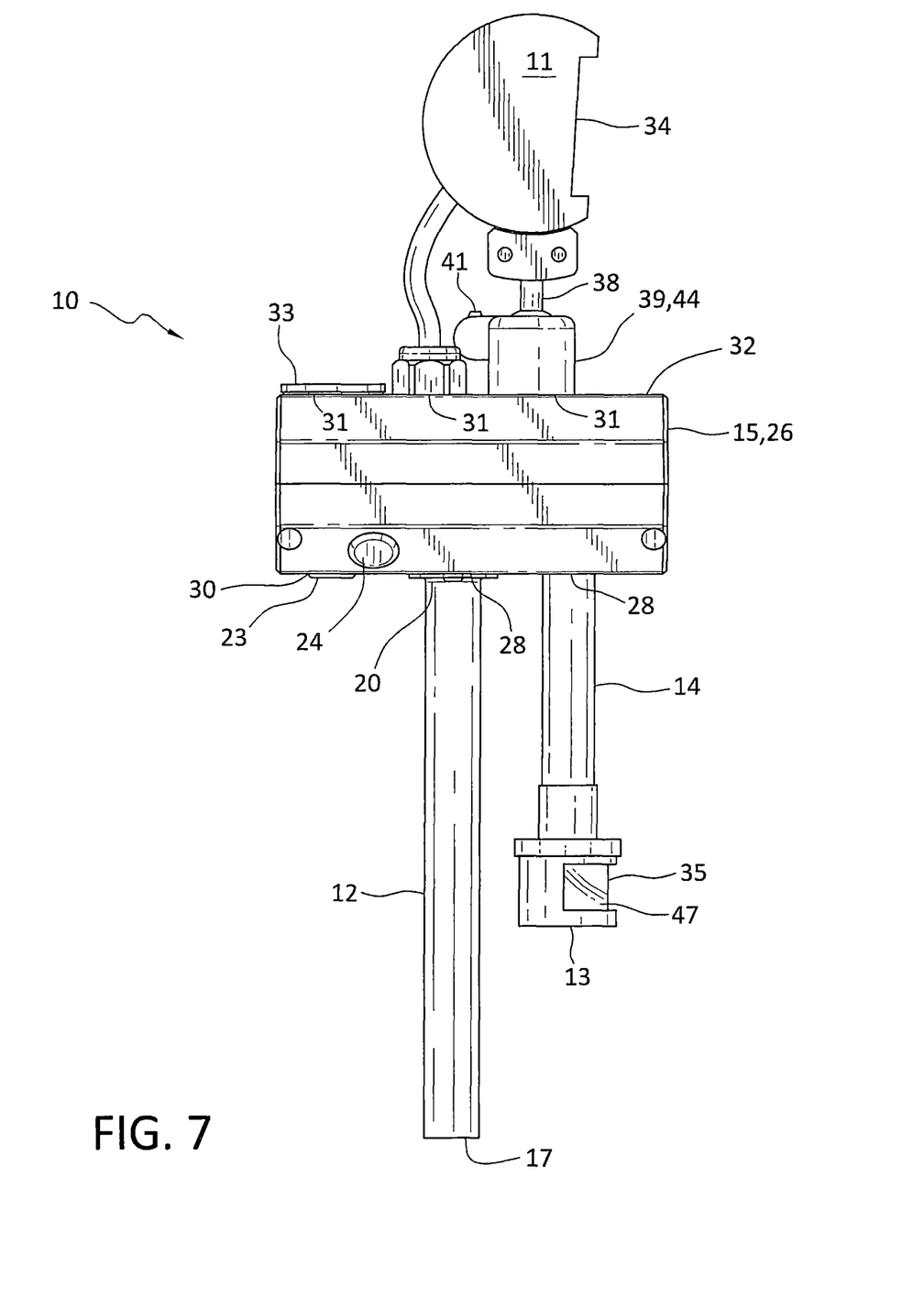
FIG. 7 is an opposite side view of a preferred embodiment of the multi-purpose light system.

The main light housing 11 is preferably, but not necessarily, located above the electrical connection box 15, as shown in FIGS. 1 through 4. The main light housing 11 is uniquely designed to change the direction of the light emitting from the main light housing 11 both vertically and horizontally. The vertical and horizontal positioning of the main light housing 11 is facilitated by a ball 36 and socket 37 located between the structure 26 and the main light housing 11, as shown in FIG. 6.

The ball 36, which fits in the socket 37, preferably has a threaded stem 38 that extends toward the main light housing 11 and enables the main light housing 11 to be removably connected to the ball 36. The socket 37 is preferably placed inside an adjustable housing 39, which is preferably equipped with an adjustable bolt 40. The adjustable bolt 40 preferably has a head 41. The adjustable bolt 40 can be tightened or loosened by turning head 41, which causes the adjustable housing 39 to tighten or loosen the socket 37 around ball 36.

When a user of the light system 10 wants to change the direction of the light emitting from the main light housing 11, the head 41 on adjustable bolt 40 can be turned to loosen adjustable housing 39 and socket 37 around ball 36, which enables the user to adjust the direction of light emitting from the main light housing 11 both vertically and horizontally. Once the main light housing 11 is placed in the desired direction, then the user can turn head 41 on adjustable bolt 40 to tighten adjustable housing 39 and socket 37 around ball 36 to fix the position of main light housing 11.

In the preferred embodiment of the present invention, the navigational light pole 14 extends between the electrical connection box 15 and the navigational light housing 13. The top 45 of the navigational light pole 14 is preferably connected to the bottom 29 of the structure 26 of the electrical connection box 15. The bottom 46 of the navigational light pole 14 is preferably connected to the navigational light housing 13. In the preferred embodiment, electrical wires (not shown) extend from the electrical connection box 15 through the navigational light pole 14 to the navigational light housing 14 to provide power to the light 35 in the navigational light housing 13. The navigational light pole 13 is preferably made of stainless steel but can be made of any material that is sturdy and corrosion resistant, such as plastic.

In the preferred embodiment, the navigation light housing 13 is equipped with a green lens 47 and a red lens 48. The green lens 47 is preferably positioned on the starboard (right side) of the watercraft. The red lens 48 is positioned on the port side (left side) of the watercraft.

It is understood that one embodiment of the present invention has been disclosed by way of example and that other modifications and alterations may occur to those skilled in the art without departing from the scope and spirit of the present invention.

What is claimed is:

1. A light system for a watercraft having a port side and a starboard side, comprising:
    (a) a main light pole having a top and a bottom;
    (b) an electrical connection box having a structure with a top and a bottom, where said top of said main light pole is connected to said bottom of said structure of said electrical connection box;
    (c) a main light housing connected to said structure of said electrical connection box;
    (d) a first light inside said main light housing;
    (e) a navigational light pole having atop and a bottom, where said top of said navigational light pole is connected to said structure of said electrical connection box;
    (f) a navigational light housing connected to said bottom of said navigational light pole;
    (g) a green lens on said navigational light housing, where said green lens is positioned on said starboard side of said watercraft; and
    (h) a red lens on said navigational light housing, where said red lens is positioned on said port side of said watercraft; and
    (i) a second light inside said navigational light housing.

2. The light system of claim 1, further comprising a first push button, a second push button, a third button, and a fourth push button, where said push buttons are located on said structure of said electrical connection box.

3. The light system of claim 2, further comprising a horn inside said structure of said electrical connection box.

4. The light system of claim 3, further comprising a USB port on said structure of said electrical connection box.

5. The light system of claim 4, where said first push button controls the electrical current to said first light inside said main light housing.

6. The light system of claim 5, where said second push button controls the electrical current to said horn inside said structure of said electrical connection box.

7. The light system of claim 6, where said third push button controls the electrical current to said second light inside said navigational light housing.

8. The light system of claim 7, where said fourth push button controls the electrical current to said first light in said main light housing to flashing mode, where said first light in said main light housing flashes at a rate of 50 to 70 times a minute.

9. The light system of claim 8, where said main light housing is positioned above said structure of said electrical connection box.

10. The light system of claim 9, where said navigational light housing is positioned below said structure of said electrical connection box.

11. The light system of claim 10, further comprising a ball and socket connection between said main light housing and said structure of said electrical connection box, where said ball and socket connection allows vertical and horizontal adjustments of the direction of said first light inside said main light housing.

12. The light system of claim 11, where said ball and socket connection is equipped with an adjustable bolt for loosening and tightening said socket around said ball.

13. The light system of claim 12, where said main light pole is made of stainless steel.

14. The light system of claim 13, where said navigational light pole is made of stainless steel.

\* \* \* \* \*